United States Patent [19]

Kashiyama et al.

[11] Patent Number: 5,293,741
[45] Date of Patent: Mar. 15, 1994

[54] WARMING-UP SYSTEM FOR WARMING UP AN ENGINE FOR AN AUTOMOTIVE VEHICLE

[75] Inventors: Kenji Kashiyama; Ken Umehara, both of Hiroshima, Japan

[73] Assignee: Mazda Motor Corporation, Hiroshima, Japan

[21] Appl. No.: 12,068

[22] Filed: Feb. 1, 1993

[30] Foreign Application Priority Data

Jan. 31, 1992 [JP] Japan .................... 4-2113
Jan. 31, 1992 [JP] Japan .................... 4-2114

[51] Int. Cl.$^5$ ............................. F02D 13/02
[52] U.S. Cl. .................... 60/284; 123/90.15; 123/585; 60/292; 60/285
[58] Field of Search ........... 60/284, 285, 286, 292, 60/281; 123/90.15, 585, 90.16

[56] References Cited

U.S. PATENT DOCUMENTS

| | | | |
|---|---|---|---|
| 3,927,523 | 12/1975 | Shioyama et al. | 60/284 |
| 4,103,486 | 8/1978 | Hata et al. | 60/284 |
| 4,114,643 | 9/1978 | Aoyama et al. | 123/90.15 |
| 5,022,357 | 6/1991 | Kawamura et al. | 123/90.15 |
| 5,027,753 | 7/1991 | Hamazaki et al. | 123/90.15 |
| 5,074,260 | 12/1991 | Yagi et al. | 123/90.16 |
| 5,205,120 | 4/1993 | Oblander et al. | 60/284 |
| 5,233,831 | 8/1993 | Hitomi et al. | 60/284 |

FOREIGN PATENT DOCUMENTS 62-67244 3/1987 Japan .
1-159431 6/1989 Japan .
2-115537 4/1990 Japan .

*Primary Examiner*—E. Rollins Cross
*Assistant Examiner*—M. Macy
*Attorney, Agent, or Firm*—Fish & Richardson

[57] ABSTRACT

In a state in which the engine is unloaded and the number of engine rotation is low, an overlap period of time during which the intake valve and the exhaust valve are both open is extended during the cold time, as compared with during the warm time. The extension of the overlap period of time causes gases remaining in the cylinders to increase, thereby making the burning of the fuel slow and elevating the temperature of the exhaust gases to thereby elevate the temperature of the cylinder head of the engine. A variation in the number of engine rotation, particularly a decrease in the number of engine rotation, resulting from the increase in the residual gases can be prevented by increasing the amount of intake air. Further, the temperature of the cylinder head can be elevated due to an increase in the amount of the supplied fuel resulting from the increase in the amount of the intake air.

19 Claims, 4 Drawing Sheets

WARMING-UP SYSTEM FOR WARMING UP AN ENGINE FOR AN AUTOMOTIVE VEHICLE

BACKGROUND OF THE INVENTION

1. Field of the Invention

The present invention relates to a warming-up system for warming up an engine for an automotive vehicle.

2. Description of the Related Art

Japanese Patent Laid-open Publication (kokai) No. 62-67,244 discloses technology capable of adjusting the number of engine rotation in a region where the engine is unloaded and the number of engine rotation is low, by providing an intake system with a bypass for bypassing a throttle valve and providing the bypass with a bypass valve for adjusting the amount of intake air.

Japanese Patent Laid-open Publication (kokai) No. 2-115,537 discloses means for changing an overlap period of time during which the intake valve and the exhaust valve are both open.

Further, Japanese Patent Laid-open Publication (kokai) No. 1-159,431 discloses an exhaust valve timing variable mechanism for changing a valve timing of the exhaust valves. The exhaust valve timing variable mechanism is adapted to change a timing for opening the exhaust valves so as to open the exhaust valves at a retarded timing during the cold time, as compared with during the warm time.

It should be noted herein that the shortening of the time required for warming up the engine is effective for measures to compete with engine emissions because the burning state within the engine is unstable and hazardous ingredients are prone to increase in exhaust gases when the engine is in a cold state.

SUMMARY OF THE INVENTION

The present invention has the object to provide a warming-up system for the engine of the automotive vehicle so adapted as to improve the performance of warming up the engine.

In order to achieve the aforesaid object, the present invention consists of a warming-up system for warming up the engine of the automotive vehicle, comprising:

means for adjusting an amount of intake air to be inhaled into the engine;

means for changing an overlap period of time during which an intake valve and an exhaust valve of the engine are both open;

a first detection means for detecting a first state in which the engine is cold;

a second detection means for detecting a second state in which the engine is unloaded and the number of engine rotation is low; and a control means for controlling said means for adjusting the amount of intake air and said means for changing the overlap period of time in response to output from said first detection means and said second detection means, so as to make said overlap period of time larger and to increase the amount of the intake air, while maintaining the number of engine rotation at a substantially constant level, during a cold time of the engine than during a warm time thereof in a state in which the engine is unloaded and the number of engine rotation is low.

By extending the overlap period of time during which the intake valves and the exhaust valves are both open during the cold time in the state where the engine is unloaded and the number of engine rotation is low, the residual gases remaining in the cylinders are caused to increase. When the amount of the residual gases is made larger, the burning is made slower, that is, an afterburning phenomenon occurs, to thereby elevating the exhaust gases to higher temperature, thereby being capable of warming up the exhaust system earlier, than when the amount of the residual gases is smaller. In addition to the increase in the residual gases within the cylinders, the amount of intake air is allowed to increase via a secondary air intake valve so as to comply with the increase in the amount of the residual gases, thereby preventing the number of engine rotation from varying to a great extent and, at the same time, capable of increasing the amount of fuel to be supplied. This arrangement can also serve as warming up the engine earlier. Further, the residual gases having higher temperature can facilitate the gasification and atomization of the fuel and decrease a loss in pumping, thereby capable of preventing the combustibility and the mileage from worsening.

In order to allow the engine to be warmed up earlier, the exhaust path may be provided with an exhaust restrictor valve to thereby make the effective opening area of the exhaust path smaller during the cold time. In this case, the exhaust work is increased; however, the amount of intake air, and thus, the amount of fuel mixed with the intake air can be increased, thereby warming up the exhaust system earlier.

Further, the ignition timing is to be retarded in order to warm up the exhaust system earlier, in place of or in addition to the disposition of the exhaust restrictor valve. In this case, the burning of the fuel is made slower by retarding the ignition timing, thereby elevating the exhaust gases to higher temperature and, as a result, warming up the exhaust system earlier.

The other objects, features and advantages of the present invention will become apparent during the course of the description of the preferred embodiments, which follows, with reference to the accompanying drawings.

DESCRIPTION OF THE PREFERRED EMBODIMENTS

The present invention will be described in more detail by way of examples with reference to the accompanying drawings.

Figure 1:
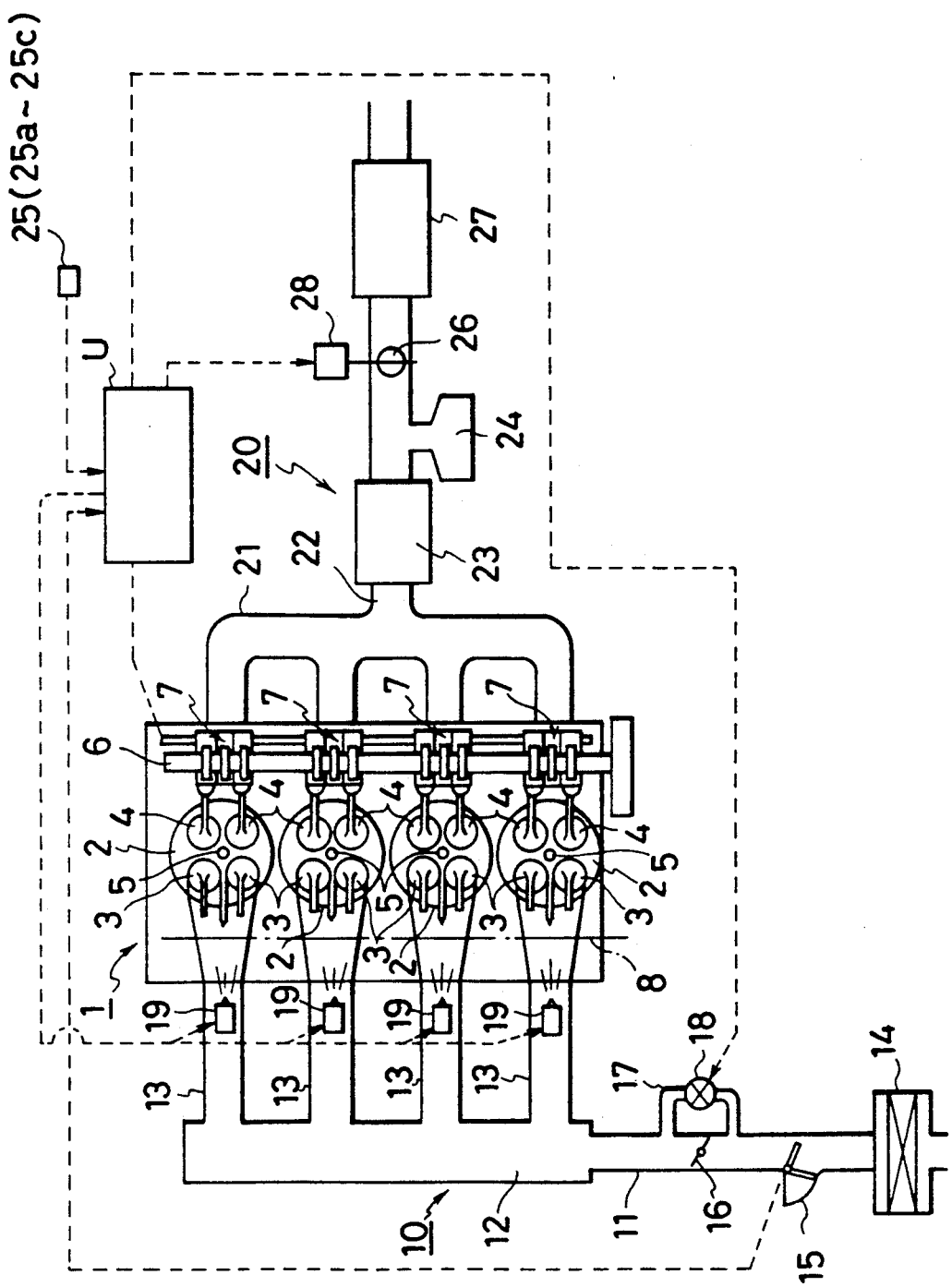
FIG. 1 is a diagrammatic representation showing an entire structure of an engine for an automotive vehicle in accordance with a first embodiment of the present invention.

As shown in FIG. 1, an engine 1 is an in-line 4-cylinder engine in which four cylinders 2 are arranged in line, or in a row. Each of the cylinders 2 is provided with two intake ports and two exhaust ports, each opening at corresponding combustion chambers, although not shown, each of the intake ports being arranged so as to be opened or closed by an intake valve 3 and each of the exhaust ports being arranged so as to be opened or closed by an exhaust valve 4. Further, each of the cylinders 2 is provided with a spark plug 5. It should be noted herein that, in the embodiment according to the present invention, the engine 1 may be of a water-cooling type. More specifically, a path for cooling water is formed in the cylinder head of the engine 1 so as to cool the portions in the vicinity of the exhaust ports which are likely to be heated to high temperature, for example, by making the portions likely for cooling water to flow in a larger amount than the other portions.

A description will now be made of a power valve system for opening and closing the intake valves 3 and the exhaust valves 4. Each of the intake valves 3 is arranged so as to be opened and closed with an intake cam shaft 8 at a predetermined timing in synchronization with the rotation of an engine output shaft. On the other hand, each of the exhaust valves 4 is arranged so as to be capable of being shifted between a first timing, as indicated by a dot-and-dash line in FIG. 2, and a second timing, as indicated by a solid line in FIG. 2, with an exhaust valve timing variable mechanism 7 mounted to an exhaust cam shaft 6.

It can be noted herein that the second timing is set so as for the timing for closing the exhaust valves 4 to be retarded, as compared with the first timing and that, when the second timing is selected, a valve overlap time (O/L) during which both of the intake valves 3 and the exhaust valves 4 are opened is set to be prolonged. In this embodiment, the valve overlap time (O/L) is indicated by a crank angle and it is set at 10° at the first timing while it is set at 40° at the second timing.

An intake system 10 of the engine 1 comprises a common intake passage 11, a surge tank 12 functioning as an intake expansion chamber, and a discrete intake passage 13 disposed discretely for each of the cylinders 2. The common intake passage 11, the surge tank 12, and the discrete intake passage 13 are arranged in this order from the upstream side to the downstream side. Further, the common intake passage 11 has an air cleaner 14, an air flowmeter 15, and a throttle valve 16 arranged in the order from the upstream side to the downstream side. In addition, the common intake passage 11 is provided with a bypass 17 bypassing the throttle valve 16, and the bypass 17 is provided with an ISC valve 18 as a bypass valve for controlling the number of idle rotation of the engine. The control of the number of idle rotation of the engine by the ISC valve 18 can be made in a conventional manner. The discrete intake passage 13 is provided with a fuel injection valve 19.

On the other hand, an exhaust system 20 of the engine 1 may comprise an exhaust manifold 21 and a common exhaust passage 22. The common exhaust passage 22 has a ternary pre-catalyst 23, an exhaust gases reservoir 24, a restrictor valve 26, a main ternary catalyst 27, a silencer (not shown), and so on, arranged in this order from the upstream side to the downstream side. The restrictor valve 26 is driven by a drive actuator 28. The exhaust gases reservoir 24 is provided so as to create a balance between preventing the pressure for rapidly discharging exhaust gases from elevating when the exhaust restrictor valve 26 is operated, by ensuring a necessary volume, and making the capacity of heat for the exhaust system on the upstream side of the restrictor valve 26.

As shown in FIG. 1, reference symbol U denotes a control unit which may mainly comprise a microcomputer composed of a CPU, a ROM, a RAM, and so on. The control unit U is fed with a signal indicative of an amount of intake air from the air flowmeter 15 and with various signals indicative of the temperature of cooling water, an engine load, and so on, from a group of sensors 25. On the other hand, the control unit U generates control signals to the spark plug 5, the ISC valve 18, the exhaust valve timing variable mechanism 7, the drive actuator 28, the fuel injection valve 19, and so on. The group of the sensors 25 may comprise a switch 25a for sensing a full closure of an accelerator, i.e. for sensing the application of no load, a sensor 25b for sensing the number of engine rotation, and a sensor 25c for sensing the temperature of water for cooling the engine.

Figure 3:
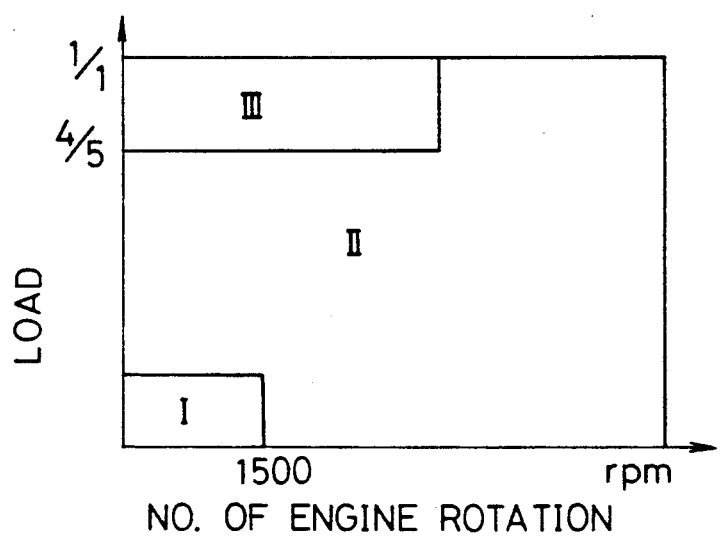
FIG. 3 is a graph showing a control map to be employed for the control in the first embodiment of the warming-up system according to the present invention.

The valve timing of the exhaust valves 4 are controlled on the basis of a map as shown in FIG. 3 in which Region I is a region where no load is applied and the number of engine rotation is low; Region III is a region where a high load is applied and the number of engine rotation is low or medium; and Region II is a region other then Regions I and III.

1. Region I

In the region I where no load is applied and the number of engine rotation is low, the valve timing of the exhaust valves is changed during the cold time and during the warm time. The first timing is selected during the warm time, as indicated by the dot-and-dash line in FIG. 2. It can be noted that the valve overlap time (O/L) at the first timing is set smaller. On the other hand, the second timing is selected during the cold time, as indicated by the solid line in FIG. 2. It can be noted that the valve overlap time (O/L) at the second timing is set larger.

2. Region III

In the Region III where a high load is applied and the number of engine rotation is low or medium, the valve timing of the exhaust valves is set at the first timing to thereby improve efficiency in filling.

3. Region II

In the region II other than the regions I and III, the valve timing of the exhaust valves is set at the second timing, thereby improving mileage due to an increase in inner exhaust gases recirculation (EGR) and reducing NOx in a region where the load is low or medium, on the one hand, and improving output by imparting a high degree of efficiency in scavenging in a region where the load is high, on the other hand.

As shown in FIG. 3, the restrictor valve 26 may be closed during the cold time in the region I. The extent to which the restrictor valve 26 is closed may be full or open to a slight extent.

A basic ignition timing of each of the spark plugs 5 may be set on the basis of a basic amount of injection of fuel (an amount of intake air) and the number of engine rotation, as in a conventional manner. The basic ignition timing is then corrected by various factors to thereby give a final ignition timing.

Figure 4:
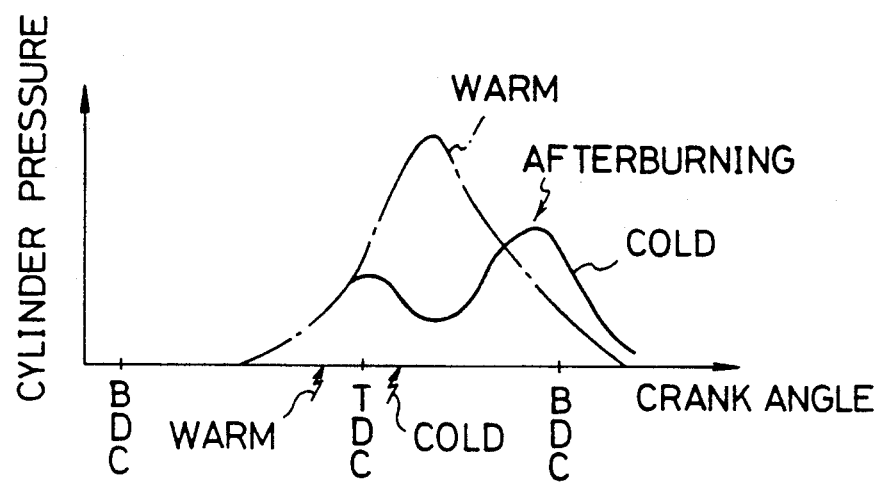
FIG. 4 is a graph showing the action of the warming-up system in the first embodiment of the present invention.

Given the foregoing, an ignition timing during the cold time is set in the region I in the embodiment of the present invention. It can be noted that the ignition timing during the cold time is set between approximately 10 deg after top dead center of compression and nearly 20 deg after top dead center of compression, as shown in FIG. 4.

Now, a description will be made of the control of the ignition timing in the region I. The spark plugs 5 are ignited before the top dead center of compression during the warm time, as in a conventional manner, at approximately 10 deg BTDC. On the other hand, the ignition timing was retarded during the cold time to a greater extent than during the warm time.

Hence, the control contents in the region I can be summarized in a manner as will be described hereinafter. In other words, during the warm time, the valve overlap time (O/L) is set to be smaller, the restrictor valve 26 is open, and the ignition timing of the spark plugs 5 is set in a conventional manner. On the other hand, during the cold time, the valve overlap time (O/L) is set to be larger, the restrictor valve 26 is closed to a full extent or to a partially open extent, and the ignition timing is retarded to a greater extent than during the warm time.

It can be noted herein, accordingly, that stability in combustion can ensured at the warm time during a small valve overlap time (O/L) in the region I where no load is applied and the number of engine rotation is low. On the other hand, during the cold time, in order to compensate for an increase in a discharging operation of the engine due to the closure of the restrictor valve 26, the angle of the opening of the ISC valve 18 is made larger, thereby increasing the amount of intake air, and thus, the amount of fuel mixed with the air. Further, in the embodiment according to the present invention, a state of burning the fuel becomes slow during the cold time, due to an increase in residual gases on account of an extension of the valve overlap time (O/L). In addition, the ignition timing is retarded, so that the burning state becomes an "afterburning" state, as shown in FIG. 4, in which the burned state is caused to occur in a late stage of an expansion stroke. On the other hand, the gasification and the atomization of the fuel can be facilitated due to an increase in the residual gases due to the expansion of the valve overlap time (O/L).

As a result, the exhaust gases withdrawn from the engine 1 becomes high in temperature due to the control during the cold time in the region I, so that a large amount of heat is transmitted to the cooling water passing through a coolant passage within a cylinder head, on account of the passage of the exhaust gases having high temperature through the exhaust ports, thereby facilitating the ability of warming up the engine 1. Further, the ternary pre-catalyst 23 and the main ternary catalyst 27, each disposed in the exhaust system 20, particularly the ternary pre-catalyst 23, can be heated and activated at an early timing, thereby being capable of demonstrating its catalytic action within a short period of time and starting to clear the exhaust gases quickly.

Further, in this case, the gasification and the atomization of the fuel can be facilitated in the manner as described hereinabove, so that mileage can be improved.

Figure 5:
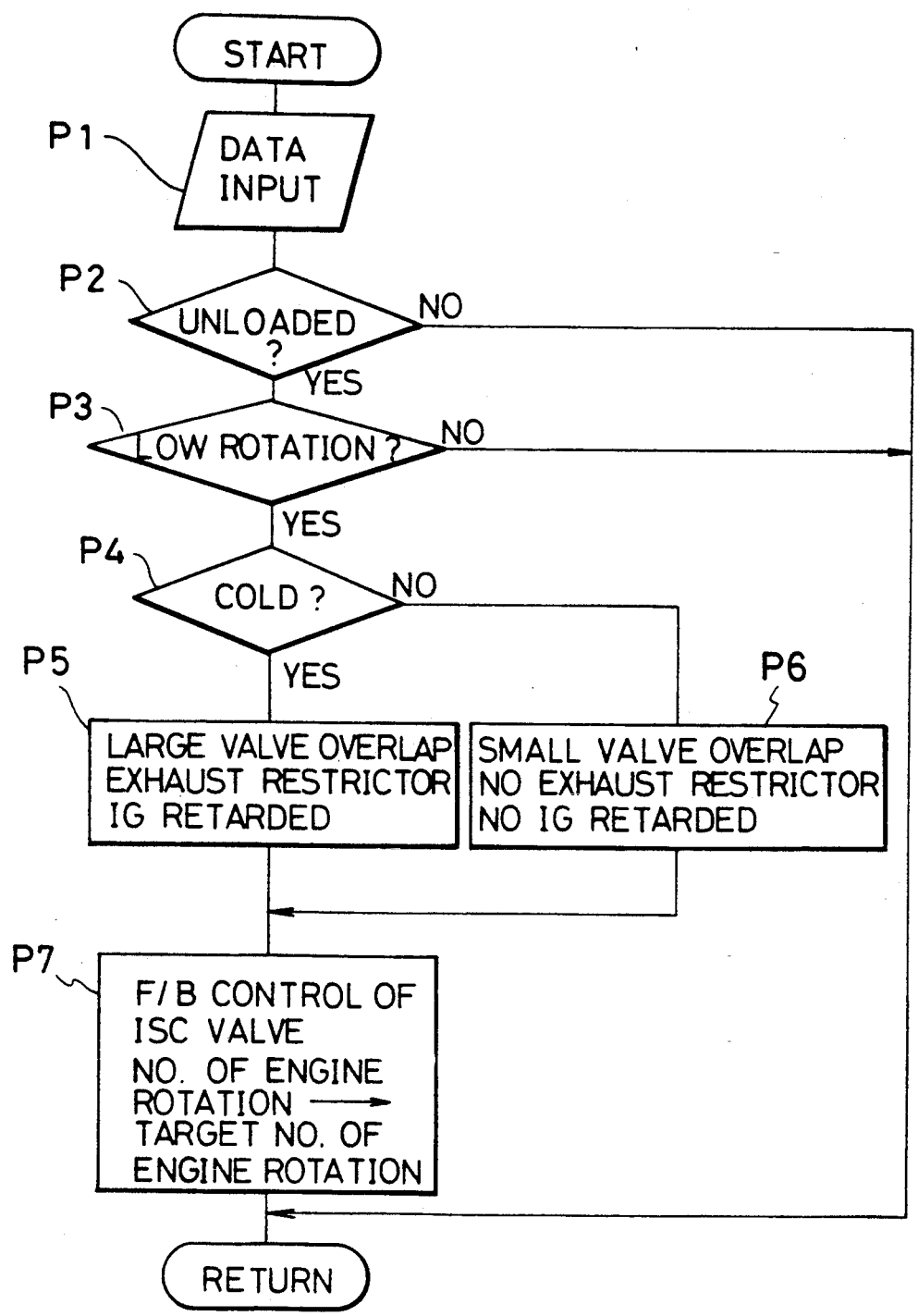
FIG. 5 is a flow chart showing the control contents in the first embodiment of the present invention.

Then, a description will be made of the control contents in the region where no load is applied and the number of engine rotation is low, with reference to the flow chart of FIG. 5.

First, at step P1, the signals from the group of the sensors 25 are read, then followed by proceeding to step P2 at which a decision is made to determine if the engine 1 is unloaded. The decision at step P2 to determine if the engine 1 is unloaded is decided by checking whether the accelerator is closed to a full extent or not, that is, by checking the operative state of the switch 25a.

When the result of decision at step P2 indicates that the engine 1 is unloaded, then the program flow goes to step P3 at which it is decided to determine if the number of engine rotation is low by checking the output of the sensor 25b, that is, if the number of engine rotation is equal to or smaller than 1,500 rpm, as shown in FIG. 3. When the result of decision at step P3 indicates that the number of engine rotation is equal to or smaller than 1,500 rpm, then the program flow goes to step P4 at which it is decided to determine if the temperature of the cooling water is as low as below a predetermined temperature, for example, 60° C., by checking the output of the sensor 25c.

Figure 2:
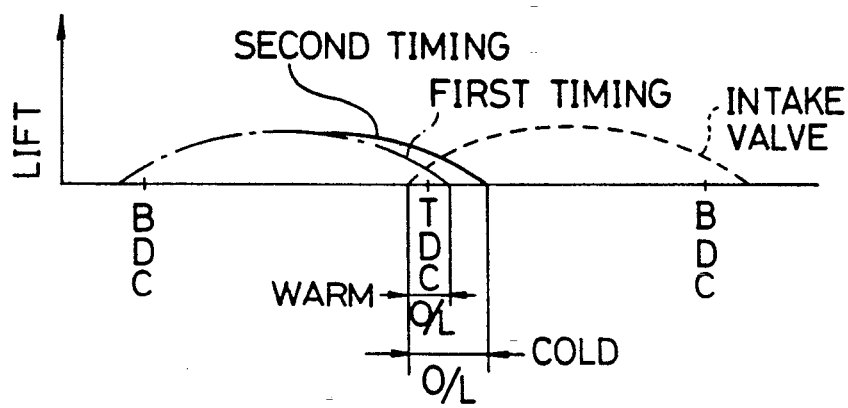
FIG. 2 is a graph showing valve timings in the first embodiment of the warming-up system according to the present invention.

When the decision at step P4 gives the affirmative result, it is determined that the engine is unloaded, the number of engine rotation is low, and the engine is in a cold state. At this time, at step P5, the valve overlap time (O/L) is set to be larger by selecting the second timing as shown in FIG. 2, the restrictor valve 26 is closed, and the ignition timing is retarded to be set to a timing after the top dead center (ATDC) of compression, as described hereinabove.

On the other hand, when the decision at step P4 gives the negative result, it is determined that the engine is unloaded, the number of engine rotation is low, and the engine is in a warm state. At this time, at step P6, the valve overlap time (O/L) is set to be smaller by selecting the first timing as shown in FIG. 2, the restrictor valve 26 is opened to a full extent, and the ignition timing is set to a usual timing by causing no retarding.

After step P5 or P6, the program flow goes to step P7 at which the ISC valve 18 is subjected to feedback control so as for the actual number of engine rotation to become a predetermined target number of engine rotation, for example, a target number of idle rotation of the engine set to 800 rpm.

When the decision at step P2 or P3 gives the negative result, it is determined that the engine is loaded and the number of engine rotation is not low. Hence, this region does not relate directly to the present invention, so that the program flow is returned as it is.

Figure 6:
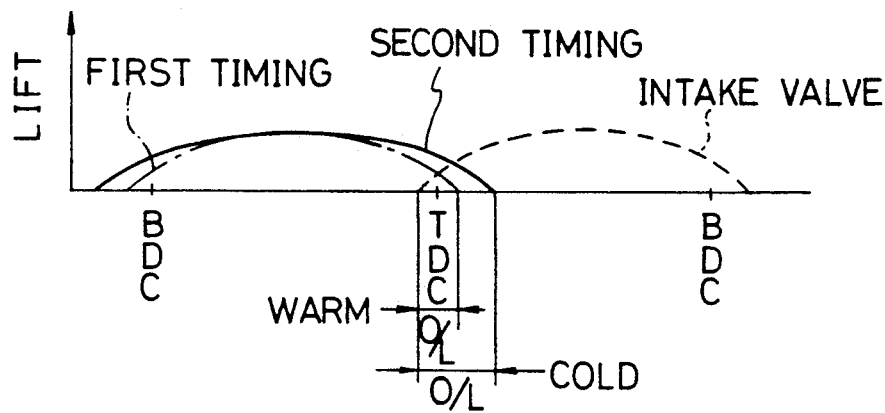
FIG. 6 is a graph showing valve timings in a second embodiment of the warming-up system according to the present invention.

FIG. 6 shows another embodiment of the system according to the present invention, which has substantially the same structure as the system in the first embodiment thereof as shown in FIG. 1.

In this embodiment according to the present invention, the valve timing of the exhaust valves 4 is so arranged as to be capable of being shifted between the first timing and the second timing, likewise in the first embodiment.

Now, a description will be made of the valve timing of the exhaust valves 4 in the region I where the engine is unloaded and the number of engine rotation is low. As shown in FIG. 6, the same first timing as in the first embodiment is selected during the warm time, where the valve overlap time (O/L) is small, as indicated by dot-and-dash line in the drawing, while the second timing is selected during the cold time, as indicated by solid line in the drawing. As is understood from FIG. 5, the valve timing of the exhaust valves 4 during the cold time is retarded in timing for closing the exhaust valves to thereby extend the valve overlap time (O/L), as compared with the valve timing thereof (the first timing) during the warm time. On the other hand, the valve timing for opening the exhaust valves 4 during the cold time is set earlier than the valve timing during the warm time, thereby capable of discharging exhaust gases having high temperature in the expansion stroke into the exhaust system 20. This arrangement can elevate the temperature of the ternary catalyst faster by the exhaust gases having the high temperature.

The extension of the valve overlap time (O/L) can be realized by retarding the timing for closing the exhaust valves 4, so that the forcible control of the ISC valve 18 can be prevented. In other words, when the extension of the valve overlap time (O/L) during the cold time is realized by setting the timing for opening the intake valves 3, that is, by changing the phase of the valve timing of the intake valves 3, the amount of intake air is reduced on account of the earlier timing for losing the intake valves 3 to be made due to the earlier timing for opening the intake valves 3. Hence, in order to compensate for the reduction in the amount of the intake air, the ISC valve 18 should be opened to an extremely large extent, thereby causing the risk that the ISC valve 18 (the bypass 17) could not compensate for the reduction in the amount of the intake air.

The present invention has been described by way of examples in the manner as described hereinabove; however, it should be understood that the present invention be interpreted to be not limitative to the foregoing description and to contain various modifications and variations within the scope and the spirit of the present invention.

The variations and modifications of the system according to the present invention may include, for example, a system in which the exhaust system is provided a restrictor valve on the downstream side of the main ternary catalyst 27 so as to make the effective area of the exhaust passage narrower during the cold time by the restrictor valve, thereby allowing the temperature of the ternary pre-catalyst 23 and the main ternary catalyst 27 to arise in an earlier stage during the cold time in the region I.

Further, only either one of retarding the ignition timing or closing the exhaust restrictor valve 26 may be implemented during the cold time in such a state that the engine is unloaded and the number of engine rotation is low. In addition, it is possible to implement neither the retarding of the ignition timing nor the closing of the exhaust restrictor valve 26. When no restrictor valve 26 is provided and only when the ignition timing is retarded, the amount of the residual gases within the cylinders may increase due to the extension of the valve overlap time (O/L), thereby causing the burning state to become slow and bringing the fuel into the burning state at a retarded timing. In other words, the start of burning the fuel at the retarded timing and the slow burning causes the exhaust gases having high temperature to be discharged into the exhaust ports, so that the heat of the exhaust gases is allowed to be transmitted to the cylinder head, thereby elevating the temperature of the cooling water passing through the cylinder head. It can be noted herein that a decrease or a variation in the number of engine rotation, which may arise due to the control during the cold time, can be compensated for by a bypass valve (means for correcting the amount of intake air) disposed in the intake system.

Furthermore, either one of the ternary catalyst 23 or the ternary catalyst 27 may be provided. In another embodiment, neither of the catalyst 23 and 27 may be disposed.

It should further be understood herein that the foregoing text and description be interpreted to be not limitative in any respect, but to be illustrative, and any modifications, variants, and changes which do not depart from the scope of the invention should be interpreted to be encompassed within the spirit and scope of the present invention.

What is claimed is:

1. A warming-up system for warming up an exhaust system for an automotive vehicle, comprising:
   means for adjusting an amount of intake air to be inhaled into the engine;
   means for changing an overlap period of time during which an intake valve and an exhaust valve of the engine are both open;
   a first detection means for detecting a first state in which the engine is cold;
   a second detection means for detecting a second state in which the engine is unloaded and the number of engine rotations is low; and
   a control means for controlling said means for adjusting the amount of intake air and said means for changing the overlap period of time in response to output from said first detection means and said second detection means, so as to make said overlap period of time larger and to increase the amount of the intake air, while maintaining the number of engine rotations at a substantially constant level, during a cold time of the engine, relative to a warm time thereof, in a state in which the engine is unloaded and the number of engine rotations is low.

2. A warming-up system as claimed in claim 1, wherein said control means is so adapted as to subject said means for adjusting the amount of the intake air to feedback control so as for an actual number of engine rotations to become a predetermined target number of engine rotations during the cold time in the state in which the engine is unloaded and the number of engine rotations is low.

3. A warming-up system as claimed in claim 2, further comprising:
   an exhaust restrictor valve disposed in an exhaust path of the engine;
   wherein said control means is further so adapted as to control an effective Opening area of the exhaust path so as to become narrower by operating said exhaust restrictor valve, during a cold time in the state in which the engine is unloaded and the number of engine rotations is low.

4. A warming-up system as claimed in claim 3, wherein said exhaust path is provided with a catalyst for purifying exhaust gases on an upstream side of said exhaust restrictor valve.

5. A warming-up system as claimed in claim 3, wherein said exhaust path is provided with a catalyst for purifying exhaust gases on a downstream side of said exhaust restrictor valve.

6. A warming-up system as claimed in claim 3, wherein said exhaust path is provided with a first catalyst for purifying exhaust gases on the upstream side of said exhaust restrictor valve and with a second catalyst for purifying exhaust gases on the downstream side of said exhaust restrictor valve.

7. A warming-up system as claimed in claim 3, wherein said exhaust path is provided with a reservoir for exhaust gases on the upstream side of said exhaust restrictor valve.

8. A warming-up system as claimed in claim 2, wherein said control means is further so adapted as to retard an ignition timing during the cold time, as compared with during the warm time, in the state in which the engine is unloaded and the number of engine rotations is low.

9. A warming-up system as claimed in claim 8, wherein said ignition timing is set before top dead center of compression during the warm time and after top dead center of compression during the cold time, in the state in which the engine is unloaded and the number of engine rotations is low.

10. A warming-up system as claimed in claim 9, wherein said ignition timing during the cold time is at a crank angle of from 10 deg to 20 deg after top dead center of compression, in the state in which the engine is unloaded and the number of engine rotations is low.

11. A warming-up system as claimed in claim 3, wherein said control means is further so adapted as to retard an ignition timing during the cold time, as compared with during the warm time, in the state in which the engine is unloaded and the number of engine rotations is low.

12. A warming-up system as claimed in claim 11, wherein said ignition timing is set before top dead center of compression during the warm time and after top dead center of compression during the cold time, in the state in which the engine is unloaded and the number of engine rotations is low.

13. A warming-up system as claimed in claim 12, wherein said ignition timing during the cold time is at a crank angle of from 10 deg to 20 deg after top dead center of compression, in the state in which the engine is unloaded and the number of engine rotations is low.

14. A warming-up system as claimed in claim 2, wherein said means for changing the overlap period of time is so adapted as to change a timing for closing said exhaust valve without changing a timing for opening and closing said intake valve.

15. A warming-up system as claimed in claim 14, wherein said overlap period of time is set at a crank angle of approximately 40 deg during the cold time and at a crank angle of approximately 10 deg during the warm time, in the state in which the engine is unloaded and the number of engine rotations is low.

16. A warming-up system as claimed in claim 2, wherein:
an intake passage is provided with a bypass for bypassing a throttle valve; and
said means for adjusting the amount of intake air comprises a control valve for adjusting an angle of an opening of said bypass.

17. A warming-up system as claimed in claim 2, wherein said engine is of a water-cooling type.

18. A warming-up system as claimed in any one of claims 1 to 17, further comprising:
means for changing a timing for opening said exhaust valve;
wherein said control means is further so adapted as to control the timing for opening said exhaust valve to become earlier during the cold time than during the warm time, in the state in which the engine is unloaded and the number of engine rotations is low.

19. A warming-up system as claimed in claim 17, wherein:
said means for changing the overlap period of time is so set as to change the timing for closing and opening said exhaust valve; and
said means for changing the overlap period of time is so adapted as to additionally function as said means for changing the timing for opening said exhaust valve.

* * * * *